United States Patent
Brinton et al.

(10) Patent No.: US 10,339,822 B2
(45) Date of Patent: Jul. 2, 2019

(54) SYSTEM AND METHOD FOR AUTOMATED COURSE INDIVIDUALIZATION VIA LEARNING BEHAVIORS AND NATURAL LANGUAGE PROCESSING

(71) Applicant: Zoomi, Inc., Malvern, PA (US)

(72) Inventors: Christopher Greg Brinton, Berkeley Heights, NJ (US); Weiyu Chen, Chicago, IL (US); Mung Chiang, Princeton, NJ (US); Sangtae Ha, Superior, CO (US); Stefan Ruediger Rill, Augsburg (DE)

(73) Assignee: Zoomi, Inc., Malvern, PA (US)

( * ) Notice: Subject to any disclaimer, the term of this patent is extended or adjusted under 35 U.S.C. 154(b) by 297 days.

(21) Appl. No.: 15/202,663

(22) Filed: Jul. 6, 2016

(65) Prior Publication Data

US 2016/0314699 A1 Oct. 27, 2016

Related U.S. Application Data

(63) Continuation-in-part of application No. 14/063,289, filed on Oct. 25, 2013, now abandoned.

(60) Provisional application No. 61/719,312, filed on Oct. 26, 2012.

(51) Int. Cl.
| | |
|---|---|
| *G09B 5/00* | (2006.01) |
| *G09B 5/12* | (2006.01) |
| *G09B 7/00* | (2006.01) |
| *G09B 5/02* | (2006.01) |

(52) U.S. Cl.
CPC ............... *G09B 5/12* (2013.01); *G09B 5/02* (2013.01); *G09B 7/00* (2013.01)

(58) Field of Classification Search
CPC ............... G09B 5/12; G09B 5/02; G09B 7/00
USPC ........................................................ 434/362
See application file for complete search history.

(56) References Cited

U.S. PATENT DOCUMENTS

| | | | | |
|---|---|---|---|---|
| 2002/0182573 A1* | 12/2002 | Watson | .................... | G09B 7/00 434/236 |
| 2006/0166174 A1 | 7/2006 | Rowe et al. | | |
| 2013/0325665 A1* | 12/2013 | Shaffer | .................... | G09B 7/02 705/26.61 |
| 2014/0120516 A1* | 5/2014 | Chiang | .................... | G09B 5/02 434/362 |
| 2014/0130076 A1* | 5/2014 | Moore | ............. | H04N 21/25883 725/19 |
| 2015/0088668 A1 | 3/2015 | Bruce et al. | | |

(Continued)

*Primary Examiner* — Robert P Bullington
(74) *Attorney, Agent, or Firm* — Gottlieb, Rackman & Reisman, P.C.

(57) ABSTRACT

A system and method to optimize learning efficacy and efficiency in an online course is disclosed. In particular, the methods include customizing the sequence of delivery of course content as the course is being delivered, in a way that does not necessitate upfront input from an instructor/author or anyone else, beyond what which would be provided for a standard, non-adaptive course already. The present invention is also directed to a system to implement said customization and individualization methods. The present method is further directed to a linear flow of delivered materials, but the flow is dependent upon student actions in the course, among other conditions. In the present invention, individualized adaptation is based on this input, but can be augmented with additional information provided by instructors, if desired, as well.

20 Claims, 10 Drawing Sheets

(56) References Cited

U.S. PATENT DOCUMENTS

2015/0206441 A1* 7/2015 Brown .................... G09B 5/00
          434/308
2016/0063881 A1* 3/2016 Brinton ................... G09B 7/00
          434/353

* cited by examiner

Figure 5

|        | File 1 | File 2 | File 3 | File 4 |
|--------|--------|--------|--------|--------|
| File 1 | 1      | 0.8    | 0.2    | 0.1    |
| File 2 | 0.8    | 1      | 0.85   | 0.2    |
| File 3 | 0.2    | 0.85   | 1      | 0.9    |
| File 4 | 0.1    | 0.2    | 0.9    | 1      |

SYSTEM AND METHOD FOR AUTOMATED COURSE INDIVIDUALIZATION VIA LEARNING BEHAVIORS AND NATURAL LANGUAGE PROCESSING

The present application is a continuation-in-part of U.S. patent application Ser. No. 14/063,289, filed on Oct. 25, 2013 and now pending, which is incorporated by reference, and also claims priority to U.S. Provisional Patent Application No. 61/719,312 filed on Oct. 26, 2012, which is also incorporated by reference.

TECHNICAL FIELD OF THE INVENTION

This disclosure generally relates to software systems and more specifically to software systems that deliver an e-learning experience within a learning scenario.

BACKGROUND OF THE INVENTION

Electronic Learning (eLearning) systems are widely used to deliver online learning and education. Increasingly, eLearning systems employ individualization methods to customize the learning experience in an attempt to improve learning outcomes. However, individualization requires significant input from the content provider and/or course author, such as manually tagging content and defining rules for individualization logic that will execute adaptation. Typically course authors need to provide parameters for the transition logic framework, which can be rather cumbersome and time consuming. Additionally, new types of behavioral data collected about students in eLearning courses—including the clicks they make on videos, the time they spend taking assessments, and the text posts that they make on discussion forums—present novel opportunity to define more effective individualization based on performance, behavior, and content, but also runs the risk of making the authoring and teaching processes even more complex.

Hence, it is desirable to design a system that can automate the processes of content tagging and defining individualization decisions based on these tags, using both behavior and performance among the inputs.

SUMMARY OF THE INVENTION

The present invention is directed to a system and method to optimize learning efficacy and efficiency in an online course. In particular, the present invention is directed to methods to customized sequence of delivery of content in a course, customized as the course is being delivered, in a way that does not necessitate upfront input from an instructor/author or anyone else, beyond what which would be provided for a standard, non-adaptive course already. The present invention is also directed to a system to implement said customization and individualization methods. In a standard online course, an instructor prepares course materials and defines a linear flow of these materials together with quizzes and exams interspersed, including grading criteria. The present method is directed to a linear flow of delivered materials, but the flow is dependent upon student actions in the course, among other conditions. In the present invention, individualized adaptation is based on this input, but can be augmented with additional information provided by instructors, if desired, as well.

A typical process of individualization consists of three fundamental steps: Content Tagging, User Modeling, and Path Switching, where there is a relationship between the latter two. The overall relationship between these is shown graphically in FIG. 1A. In the present invention content in content files can be textual, audible, and/or visual, such as in a video or animation. In a preferred embodiment of the present invention, Content Tagging is accomplished through a natural language processing method, which processes text, video, and audio so as to extract the key course topics and their locations from the content files. Additional key course topics may also be extracted from a document, such as a course syllabus or outline. A general sequence of content files is established based on the syllabus (or equivalent).

User Modeling is accomplished on a topic-by-topic basis, by monitoring both a student's learning behavior and assessment performance with the material pertaining to each topic. For behaviors, in particular, sets of actions that students make which have been observed to indicate confusion are used to update the model.

In a preferred embodiment of the present invention, a preferred path is initially established such that the path encompasses content files which together cover all syllabus topics but not necessarily encompasses all available content files. Finally, to the extent appropriate for an individual, the path can be changed or "switched". Path Switching is performed at set intervals throughout the course, such as but not limited to at the time a student completes a course module, by determining whether a student will benefit from an alternate content file, or sequence of content files, at any given time and, if so, correspondingly adjusting the student's path. A goal of the present invention is to adjust the path as needed, thereby improving the delivery sequence on a student by student basis, such that all material is covered in the most learning-effective way for each student. These potential revised sequences of content are determined by analyzing similarities between content files covering similar topical areas, and mathematically comparing their topic distributions as determined during the Content Tagging stage.

The decision of whether it is necessary to branch to an alternate sequence is determined through machine learning associated with the student and triggers in the User Model. From the set of potential sequences, an at-that-time optimal one is determined by generating a prediction of the student's knowledge and/or preferences on the course topics after the processor of the present invention, in a modeling sense, traverses each of the potential paths, and chooses the one with the highest value.

This is not to say, however, that the instructor/author cannot provide input to the adaptation. If he/she has models to input into one or more of the stages, those can be accommodated. For example, the author may already have a variety of content sequences that can serve as potential learning paths, eliminating the need for the similarity step in Path Switching.

It is important to recognize that once a course is assembled by amassing a collection of content files, the course can be changed. An instructor, for example, can create and/or add new content files for the course and replace old ones. In addition, as new course files are added, replaced, or removed, the processes of the present invention—tagging and path development—are restarted.

The present invention is believed to include several novel attributes such as the ability to customize the selection of modules to be delivered to a student while the course is progressing and based on the student's interaction with the course. The interaction can take the form of mouse clicks, durations between mouse clicks, sequences of mouse clicks, selection of topics to review, durations on particular screens, quizzes and results, and body movements, as observed by cameras and/or audio recording instrumentation. These (among other) various interactions are captured by the system of the present invention and parsed so as to determine the student's overall strengths and weaknesses and specific positives and negatives relative to the topical material. Once determined, a next module, aligned with the course syllabus, is delivered to the student, where the module is one most likely to be in line with the student's strengths and abilities.

The benefits to the present invention are numerous and include the ability to pro-actively and automatically capture content in a course module so as to align the module with appropriate syllabus topics and reduce the time a student spends in an online course by matching the student's abilities with the best available course material for that student.

BRIEF DESCRIPTION OF THE FIGURES

FIG. 5 depicts an example of the similarity matrix after the system compares the information. The matrix is a symmetrical matrix because the value of the similarity is the same when comparing A to B or comparing B to A.

FIG. 9 depicts an example of a user skimming over content within a module. The areas where he/she is playing are short relative to the skips in-between.

DETAILED DESCRIPTION OF THE INVENTION

Figure 1A:
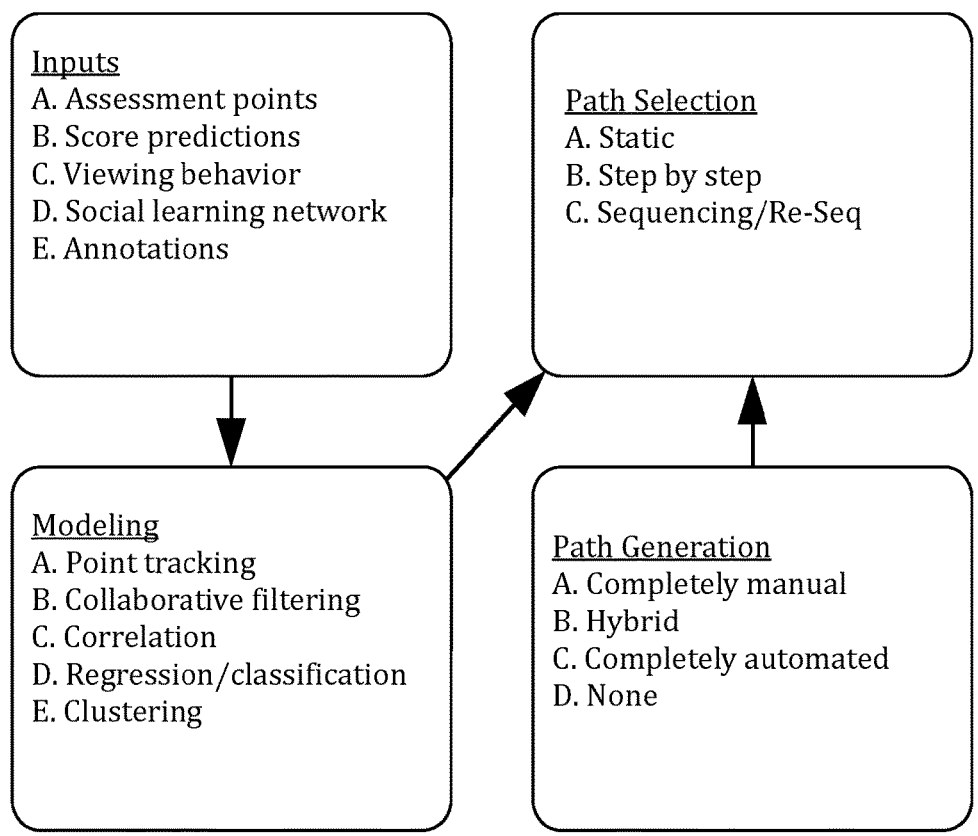
FIG. 1A depicts the path generation process of the present invention, as well as the different components of individualization.
Figure 1B:
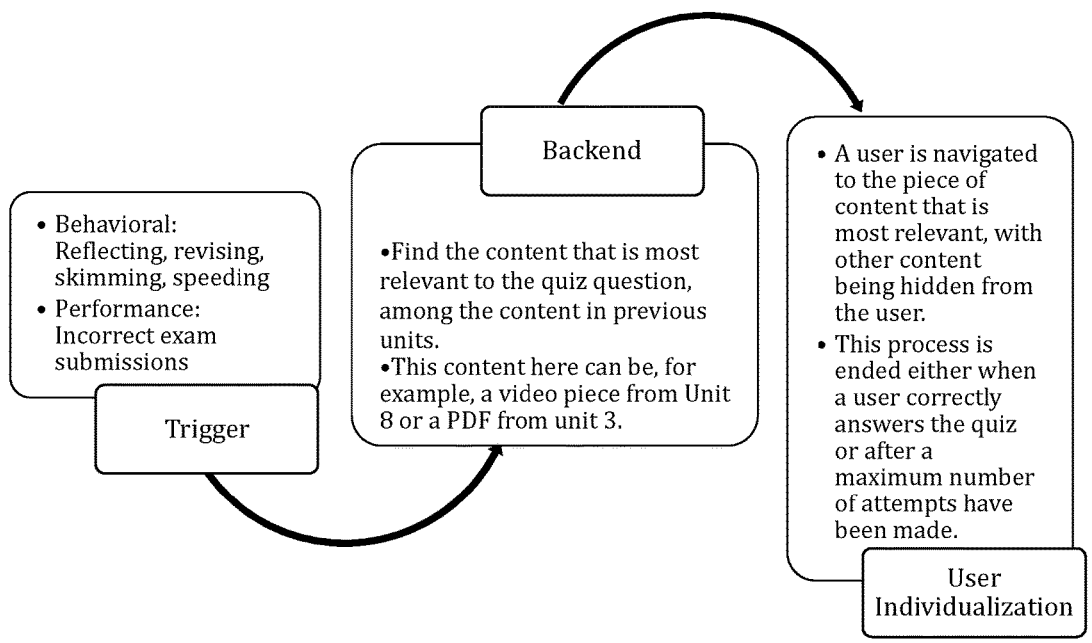
FIG. 1B gives an example of individualization for a user via this invention.

The present invention is necessitated by use of a computer, which is needed because the course is delivered via the internet and all user interactions are via the internet. The present invention is directed to development and implementation of an online course that is delivered in a customized way to a student. The course is comprised of a series of modules, each including at least one content file. Each content file represents at least one portion of the course syllabus. Different content files may reflect similar content but include different approaches to delivery of the content, such that different files may be more attuned to different learning styles; in general, these are referred to alternate learning modes.

From a hardware system perspective, the present invention includes a server architecture that contains one or more databases for storage of user and content information, which may or may not be updated over time, as well as storage of behavioral data. A content store contains the content items such as videos and/or references to external (stored external to the system of the present invention but accessible by the present invention) content that is available from third party content providers. The server architecture may include several processing stages (backend) that are responsible for the collection of measurements of user learning behavior, analytics such as content analytics, user learning behavior analytics and decision making. The software may be installed on multiple server instances that will allow for the scalability to millions of users and utilizes technologies typical for 'Big Data' processing, such as distributed processing, in-memory databases, high throughput message brokers and parallelization. The content is served preferably using the HTTP protocol, however other techniques such as ICAP (Internet Content Adaptation Protocol) and custom protocols may be deployed as well or alternatively.

The user interacts with the content via a display terminal that contains or is sent software presenting the courses and content based on decisions made by the backing server architecture. This software is referred to as the Integrated and Individualized (IIC) course delivery player, because it can integrate any number of learning modes and supports individualize content delivery through the methods described herein. The IIC Player provides a user interface that has the capability of rendering a course overview, like a table of contents, and the content files within the units making up the user's current learning path. The system architecture is summarized in FIG. 2.

While this description focuses on a server-based infrastructure with internet connectivity of the display terminal, one may imagine an architecture running on the user's display terminal without any or only rare internet connectivity. In this case, core functionality like storage of behavioral data, learning-behavior analytics and content storage are then implemented in the IIC Player. Content analysis would be performed in advance by the server infrastructure and the content, together with the resulting analysis, would be downloaded to the IIC Player or combined as a package with the IIC Player. In this case the IIC Player would be responsible for making decisions regarding the learner's path. During windows of internet connectivity data may be send to the server infrastructure and the display terminal may receive additional instructions and/or software components to further enhance the capability of the IIC Player.

The present invention consists of methods for individualizing content delivered to students in an online course or a set of online courses, in a manner that requires no additional in-process input from instructors/authors, as well as a system for implementing this functionality. The individualization is based on a combination of appropriately sequenced course topics, such as those attainable from a syllabus; and on a student's learning strengths as well as preferences. The individualization is at least in part delivered consequential to analysis of tracked student actions in viewing prior delivered modules in the present or previous courses.

The online courses to which this invention may be applied can include those that deliver any type of learning mode (i.e., content files) to end-users, including but not limited to one or more of videos, textbooks, articles, PDFs, slides, interactive presentations, animations, and/or simulations. Within a course, it is common for the instructor also to provide assessments in the form of quizzes, tests, and/or exams along with the grading criteria to evaluate a student's progress. For online courses, these assessments can be embedded in content files and often require interactivity by students (such as by answering questions). The invention can make use of the results of these assessments for individualization, though the present invention applies in cases where no assessments are provided as well. When assessments are included, the results of these assessments can be weighted and algorithmically included as a part of the path decision process and such weighting can be automatically adjusted based on attributes such as relevance to next syllabus topic or strength of differences in a student's observed learning skills. The results can include, for example, student attempts at correct answers, word choices in answers, time to answer, activities (e.g., look ups, either internal to the application or external) between delivery of the question and the student's answers, student confidence, and so on. The described combination of such results can be compared with known combinations, particularly in consideration of the subject matter, to obtain an understanding of the student's absorption of course content. Such information is usable by the system of the present invention to make a determination of what next module to deliver to the student—both in terms of subject matter and type of content (for example, more heavily video, more heavily text).

An important feature of the present invention is that no manual content tagging is required, nor is manual definition of individualization logic. That is, the present invention is directed to capturing an individual's actions relative to completing course content and consequently adjusting delivery of later modules, including module selection and sequence of delivery. While described herein as capturing actions based on a student's interactions with their display terminal (e.g., clicks, mouseovers, and the like), the present invention further contemplates capturing physical actions of the user such as but not limited to eye and hand movements, physically leaving the proximity of the terminal, and so on, and using those actions (and durations between actions) in the decision process as well.

Figure 2:
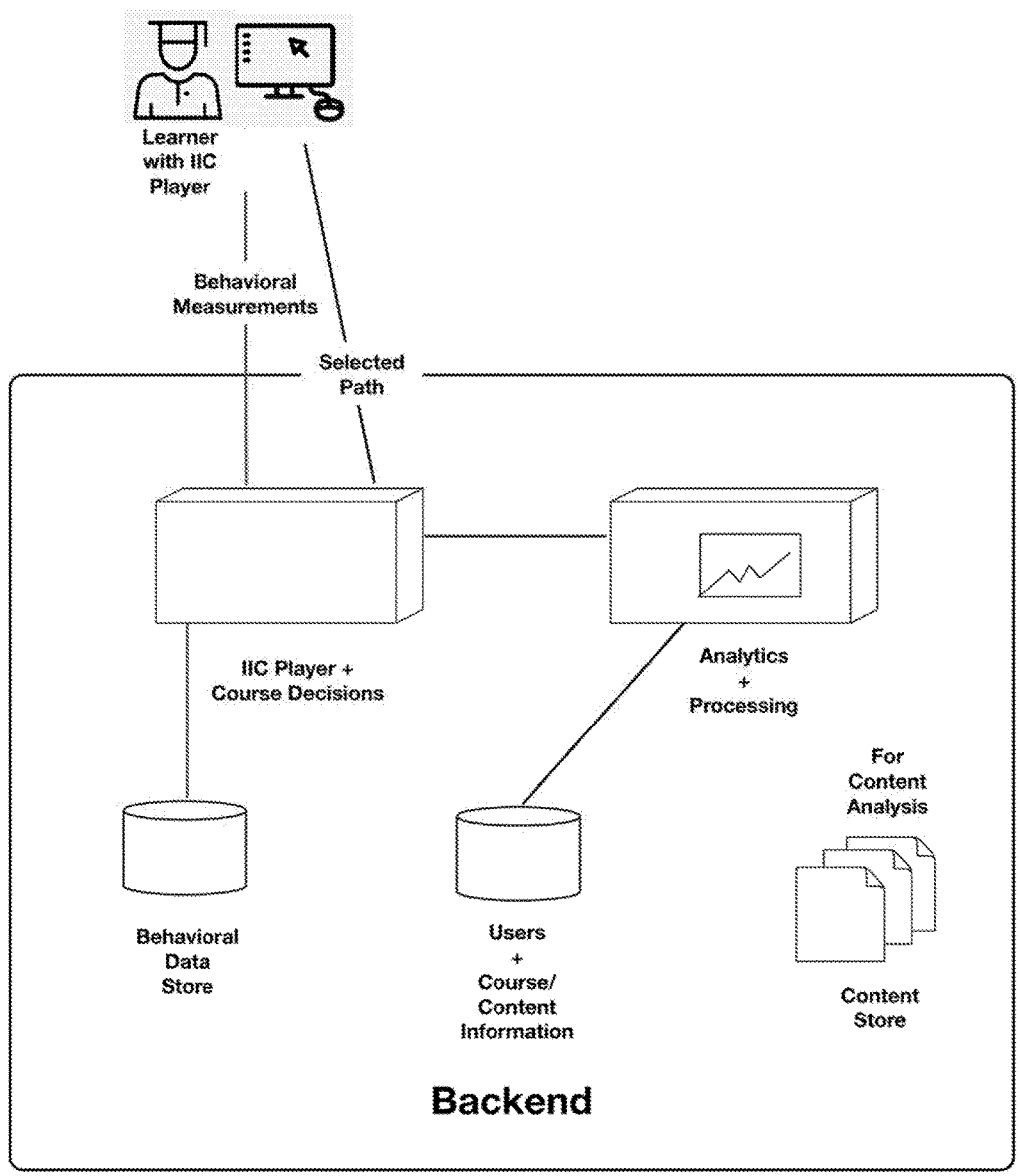
FIG. 2 depicts a preferred system architecture supporting the delivery of an individualized course to a student.

Usually an example to individualize the learning experience includes two parts: one to manually tag the content with labels so that the system has information related to the content; second is to define the condition and the path of how individualization is triggered and course content routed. The present invention automatically formulates a short-hand description of content (in the form of one or more tags), effectively organized to match a course description, outline, syllabus, or similar document, and compares a student's use to this short-hand notation to optimize the student's learning. The system of the present invention preferably resides inside the system that contains the learning content fed to the end users, as depicted in FIG. 2. The present invention uses Natural Language Processing algorithms, alone or in combination with other known approaches, to automate the process of tagging, and universally applicable transition rules can be applied to adapt based on these tags. That is, any audible content is processed and analyzed for the purpose of tagging. As needed, this may include speech to text processing.

A goal of the present invention is to assist users in fully (and optimally) understanding all topics in the course, and to optimize this learning process by automatically selecting the best available content that directly corresponds to the topics currently in the syllabus and in line with the user's skills and/or abilities.

As background, in the context of the present invention a course is comprised of a plurality of content files, with different such files potentially of different media types. Each content file is akin to a module, where a module covers one or more syllabus topics. Some content files may overlap other content files in the material covered. However, even if there is some overlap, the approach of two content files might be appreciably different. For example, one may be better utilized by a visual learner and the other might be better utilized by a textual learner. In another example, one may be more mathematical formula based and another may instead include more videos or more textual detail. Each of these content files is separately labeled or tagged, and each may lend itself to different forms of learning.

Also, the term "user" or "learner" as referenced herein refers to any person participating in any learning scenario using the disclosed embodiments and is not limited to any particular level or status of a person. For example, user here can include, but not be limited to, an employee, a student, a person being tutored, and so forth.

The previously described backend server architecture has the capability to process content. Submodules are capable of transforming content, e.g. converting an audio track containing speech to a digital transcript and storing the transcript in a contact store, and performing further analysis as described hereafter. To achieve this, a module reads the data from the content store or from the external source, stores the data in memory and performs necessary actions such as content labeling and content transformation. Transformed content will undergo content labeling steps (e.g., tagging) and further analysis as well. The resulting information is then stored in a database or used to update already existing information. This information together with other data, e.g. behavioral learning data, are then processed and used for decision making when selecting a learning path. A representation of decisions may be stored in a database to establish a learning history for the user and to improve the process described in this invention via user modeling. In general any data derived from content processing and analysis and learning-behavior analysis and data produced within these steps can be stored and utilized for future optimizations.

Figure 3:
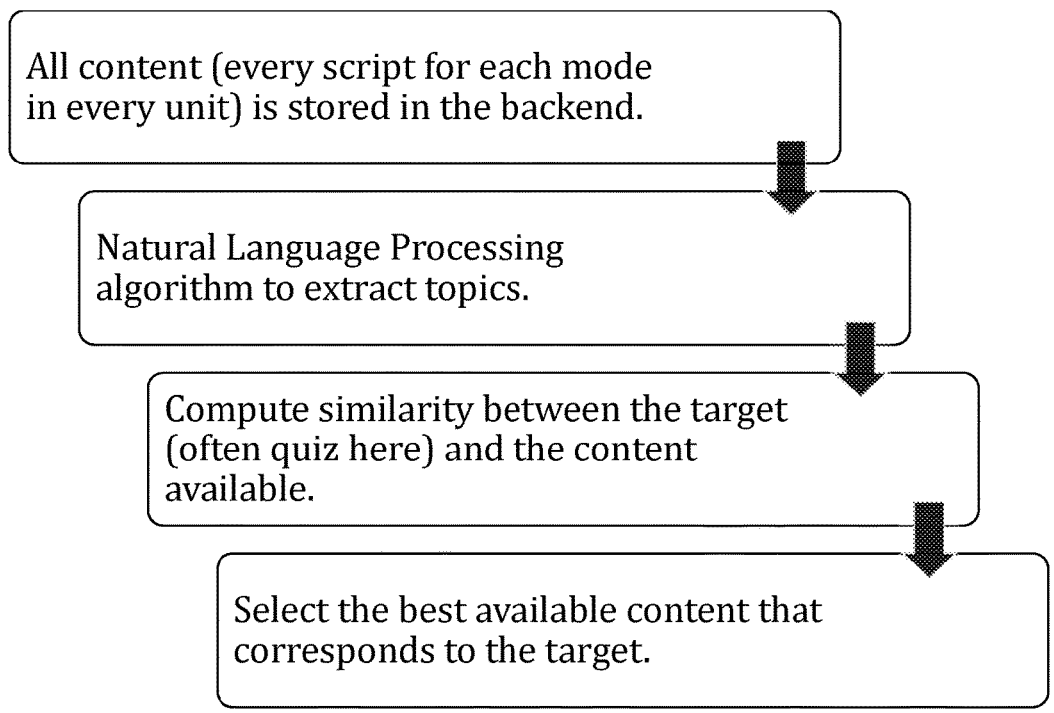
FIG. 3 depicts the mechanism to select the mode to individualize based on test performance.

The process of individualization in the present invention is organized into three parts, as shown in FIG. 3: Content Labeling, User Modeling, and Path Switching. Each of these steps will be elaborated on in what follows.

To start the process of Content Labeling, the present invention obtains a textual form of each of the content files. This may already be provided, for example, in an article/textbook/webpage, or in a video that has subtitles. Alternatively, to obtain a textual form of a content file, the present invention may require an extra level of processing by the backend of the present system (as described above), for example, by applying a speech-to-text converter to an audio file or applying Optical Character Recognition to a PDF/image file or some combination. This process is independent of any content "translation to text" provided by an instructor, however instructors can also provide raw material in scripts, if desirable. On the other hand, the backend can take the responsibility of transforming the materials to raw scripts. After the above, any text data with its position in the current file is stored in a data store associated with the backend for further processing. That is, the content file and associated text data are stored.

After preprocessing the text data, the backend will start the Content Tagging process and conduct, for example, natural language processing to learn the main topics in the materials and, as appropriate, match or compare these to the syllabus. A traditional way of content labeling usually requires manual input from a content provider or instructor. In the present invention, manual input can be incorporated into the system but is not required. The present invention employs automatic Content Tagging via NLP methods. The NLP (Natural Language Processing) methods used here may include, but are not limited to, LDA (Latent Dirichlet Allocation) or TF-IDF (Term Frequency/Inverse Document Frequency). By applying these methods, each file in the course is then represented as a distribution of constituent topics, and each topic is represented as a distribution of constituent words. A "distribution" is a mathematical object that gives the fraction of each item (here, word and topic) that appears in the larger collection (here, topic and file, respectively). For example, suppose the extracted topics for an article are Apple and Banana. In this article, Apple and Banana each shows up 5 and 8 times respectively. Then, the output frequencies will be "Apple 5 Banana 8", and the resulting distribution will be "Apple 5/13 Banana 8/13" (since a distribution must sum to 1). The frequencies of the topic terms are significant here because the more frequently a term appears intuitively the more important that particular term is likely to be. Note that stop words (for example, I, and, the, and so forth) need to be excluded. If a syllabus, outline, or related material is available, that material is usable as a guidepost to better understand topics. The distributions, particularly the frequency of the topic terms, are used later to calculate similarities between content files and are used relative to syllabus topics. If, for example, a user is recognized as having difficulty with the concepts of "banana" and "apple", that recognition can be used as input in determining which content file to deliver to that user. Such recognition may be determined by recognizing that the user has to review content with those terms, performs poorly on quiz questions associated with those terms, has poor confidence relative to those terms, or some combination of these or similar factors.

In the context of the present invention, each student becomes associated with a user model, which is a vector specific to the student that adjusts as the system tracks the student's knowledge of, and preferences on, each of the topics that comprise the course. This vector is modified as the student interacts with the content in a content file based on the student's interaction with the content file. For instance, if the student scrolls back to hear the word "banana" six extra times, the vector for that student's use of the content file has "banana" correspondingly incremented. This revised vector is used as an input in determining the next content file to deliver to the student.

The tagged content in each content file is analyzed and compared to a syllabus (or course outline, course description, or the like) so as to identify a fit within the syllabus. Synonyms to the tagged content of the syllabus are also used (e.g., a thesaurus is relied upon). The frequency of different terms appearing in a syllabus results in weighting factors for those terms. Based at least in part on these frequencies and potentially on author input as well, a content file's other characteristics can be identified. These characteristics may include, for example, degree of difficulty, and the types of media used. The combination of these characteristics and tagged content are used to form a larger distribution (including the content topic distributions as subsets of this distribution) descriptive of the content file, where weightings may be used for the different frequencies and characteristics. The weights may be based on a variety of factors, such as but not limited to importance to the syllabus and frequency. While two different content files may each cover the material in a syllabus portion, they may do so differently and they are characterized by their individual (for the student) distributions. Depending upon the user, one distribution may be a better fit than the other, and an analysis of a user model vector against these possible distributions is used to determine the next content file to deliver to the user.

Within one course, there may be many modules, with possibly more than one file (e.g., video, article, text, PDF) in each module, with each file exuding a certain combination of learning modes (e.g., verbal, audio, visual). For example, a module may have a plurality of slide presentations, some with audio, as well as a video presentation. Therefore, the backend may have many distributions with the extracted topic terms and the associated frequencies. These distributions, forming one major matrix of distributions, are stored in a data store with the backend for further processing. This process is summarized in FIG. 3.

After Content Tagging, the second step is User Modeling. User modeling consists of machine learning techniques that map the inputs to update a low-dimensional user model, which contains information about a student's current state of learning. Ultimately such information will guide the content adaptation and path switching based on user knowledge and/or similarity to them.

The User Modeling takes input from behavioral measurements collected from the IIC player, as depicted in FIG. 2. As users interact with the course material, their behavior is constantly monitored and subsequently uploaded to the server and then to the system of the present invention. In addition, the present invention includes the ability to leverage devices at the user's premises and capture other data as well, such as hand, eye, and other physical movements, as well as sound, through use of any embedded microphones or cameras. That is, all user physical interactions with the computer, including but not limited to clicks and rollovers, together with their sequence and clock time of events (and time between events) are captured for analysis.

These different types of data captured (i.e., measurements) can be broken down into three general categories: behavioral signals, quiz responses, and social learning. The behavioral signal is explained further in the following paragraph. A social learning network inferred from e.g., series of posts and comments on a discussion forum or note sharing can be fed as measurement into the server as well.

Behavioral signals are derived from the student's behavior while interacting with the learning content. They include both summary quantities and motifs. A summary quantity is a measure such as fraction completed, time spent, number of scrolls, and/or number of pauses that give a summary of how the learner "behaved" while interacting with the content. A motif is a specific sequence of actions that is seen to occur significantly often while students interact with content, and these motifs have been divided into four groups with each group representative of a type of learning action: reflecting (i.e., stopping to pause on content frequently in-between browsing through, as in FIG. 7), reviewing (i.e., skipping back to common locations in a file a few times while browsing through, as in FIG. 8), skimming (i.e., frequently skipping over parts of the file, as in FIG. 9), and speeding (i.e., browsing through parts of the file at a faster than normal speed). We have verified that these aggregate quantities, as well as the occurrence of specific motifs, can be associated with statistically significant increases or decreases in the student's understanding of the corresponding material. For example, if the system detects that a user has exhibited reviewing behavior on a certain parts of a content file, this user may require supplementary explanations on that topic.

In other words, certain sequences of user actions (referred to herein as motifs), such as a rewind followed by particular mouse clicks, have been found to relate to student understanding. Consequently, when such motifs occur, a certain confidence in student understanding (or lack thereof) can be determined, which in turn can impact the selection of questions (and/or optional answers) used in quizzes and can impact selection of the next module for delivery to the student. Further, such confidence can be used in combination with the answers to questions to determine the next module for delivery to the student.

For quiz responses, the IIC player records the user responses and user behaviors in responding and uploading the data to the server. A particular content file can include one or more assessments for the user to complete. Such assessments can be varied based on, for example, the delivered content files, the user's prior test results, the model of the user, or anticipation of an upcoming content file. An assessment signal is generated for each question and can contain at least three types of information: points awarded for the student's answer, the time taken to generate the answer, and the student's confidence level in the answer. The confidence level is determined when a student is asked whether he/she is confident in the answer.

After the data measurements are collected, machine learning techniques are applied to translate the behavioral measurements learning proficiency in order to understand user knowledge. The machine learning techniques include, but are not limited to: correlation, classification/regression, and others depicted in FIG. 1A, as well as motif extraction and identification; the system of the present invention is capable of identifying motifs that have been extracted from previous datasets (e.g., reflecting and reviewing), as well as searching for new motifs in the data that are significantly correlated with increases/decreases in knowledge.

In at least some cases, a baseline User Model is first established and the aforementioned proficiency is used to establish a customized baseline User Model for a particular student.

With the User Modeling generated accordingly, the last step is Path Switching. The purpose here is to specify a learning path a user may follow, thereby defining the adaptation logic. This logic compares the updated user model to the properties of each path and module and is used to select a learning path that best suits the user, in terms of factors including but not limited to learning proficiency and learning style. Note that, an author or an instructor may provide information to specify the possible transitions from one module in terms of conditional intervals on one or more features, such as a specific level of proficiency on a particular topic (learnable from analysis of collected data). However, the system in present invention does not necessarily require such manual input. The system, by calculating similarities, may automatically select the next module to present or a combination can be used. Such method is explained in the later paragraphs.

Here, a learning path is defined as a sequence of modules. A module relates to one or more discrete learning topics such as one or more syllabus sections, and the course may contain a number of different versions, each version comprising one or more content files corresponding to alternate presentations of the content. In a static regime, the path is fixed based on information acquired at the beginning. Our system currently ordinarily (but not exclusively) uses a step-by-step approach where the next module-version is determined at the end of the current one, so only the learning path up to current point is known. Note that the path selection is done at the end of each module; i.e., as a user is in the middle of learning a module, the individualized learning path will not be triggered until the module is completed.

As background, based on the tagging, the present invention includes a determination of each content file's general location in the sequence of material in the course and establishes a general map of the relative sequence of potential content files. That is, a syllabus, for example, may be used to identify the sequence of delivery of materials and the present invention includes the ability to recognize where in the sequence each content file belongs. But as noted earlier, multiple content files may be comprised of similar material, and therefore similarly positioned in a sequence so as to largely be redundant. However, different content files may be directed to different types of learners and may, for that reason, be located "parallel" to one another. Based on a student's learning skills and abilities, as well as the content in the content file, certain of the content files may be preferable for him/her than others, and a preferred path through the files may be established. Such a user-specific preferred path may be determined by a combination of several factors, such as but not limited to student success in one or more learning content files, behaviors in prior content files, results of similarly situated students, and an initial and/or on-going assessment of the student, all of which is reflected in the user model.

Figure 4:
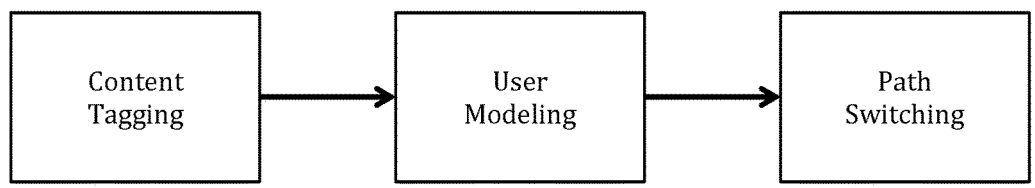
FIG. 4 depicts the three different stages involved in individualization.

After a unit of content is delivered to and studied by the student, a determination must be made for whether the student needs to receive supplemental material on the current topics. These determinations are specific triggers reflected in the user model. As outlined in FIG. 4, a user can move ahead to the next topic or even skip a topic. The determination is based on a thorough analysis of the User Model in several ways. An easy category of the determination is a binary trigger. An example would be, a student may have completed a module, which consequently led to different versions of the next module, as in FIG. 6: the system identifies a trigger in Module 6, and consequently routes the user to the article in Module 4, and then the PDF in Module 5, before continuing along the original sequence of modules. Alternatively, the video in Module 3 followed by the article in Module 5 could be chosen, depending on other dimensions of the user model at that point in time.

Note that a user may activate one trigger at a time or multiple triggers at a time. In the case of multiple triggers activated, the resulting individualization will be an aggregated content resulted from the multiple triggers, determined through a ranking of the different triggers. These rankings may be preassigned or, alternatively, be calculated, such as based on some severity index. For example, in FIG. 6, this is how the determination of whether the related content from Module 3 or Module 5 is visited first. If additional triggers are detected while the student is visiting the alternate content, the triggers can be ignored, or can result in generating a stack of alternate paths within the current path (e.g., a trigger in the video for Module 3 could in turn route a student to the optimal review content for Module 3). Eventually, this process must time out, however, at which point the student will proceed forward on the syllabus.

If it is determined that the student does need to visit an alternate path, then the backend will determine a potential new path algorithmically. The method to seek the best available content applicable to the student includes, but is not limited to, cosine similarity. The cosine similarity is a standard measure of the similarity of two vectors, varying between −1 (perfectly negative correlation) and +1 (perfectly positive correlation) while a similarity of 0 means there is no correlation. Another measure of similarity could be KL Divergence, which quantifies the "departure" of one vector from another, when the vectors are both probability distributions.

Figure 6:
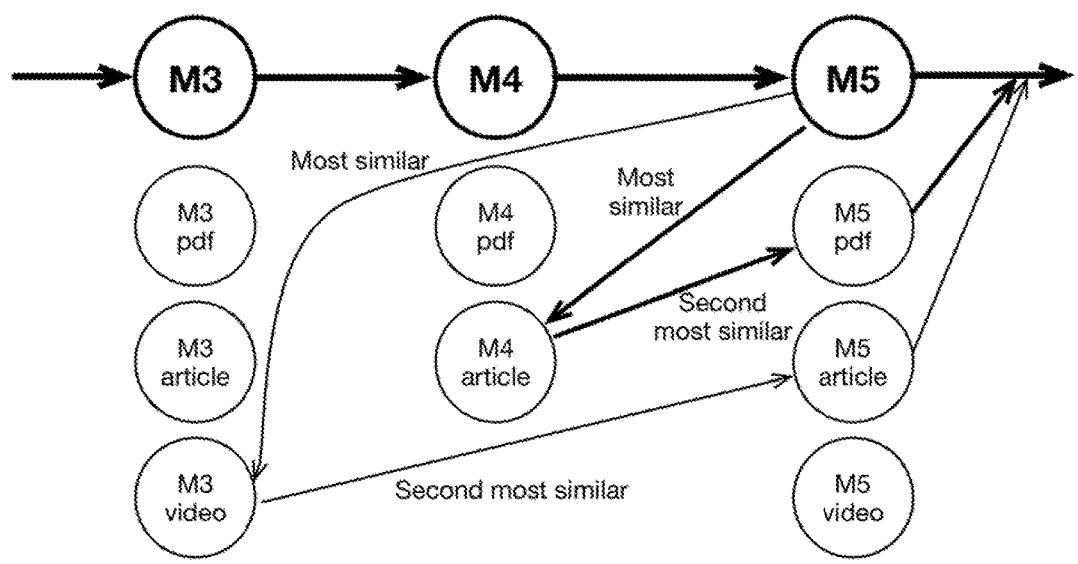
FIG. 6 depicts an example of the path switching process.

With the matrix of topic terms and associated frequencies stored in the backend, the backend will take the distribution for this content unit and compute cosine similarity between this particular distribution and the distributions extracted from the previous content files in the course. In the present invention, we do all such computation between each pair of files for all files, and store the result in a file-to-file similarity matrix. An example of such a matrix is shown in FIG. 5: here, there are four files in the course, and row I, column J indicates the similarity between files I and J. These values are meant as examples to illustrate the key properties of similarity, and will vary depending on the specific files that make up a course. Notice the matrix is symmetric, i.e., the cosine similarity between file I and file J is the same as the cosine similarity between file J and file I, though this may not be the case depending on the similarity measure that is used (e.g., it is always true for cosine similarity, but not for KL divergence). All diagonal entries in the matrix are 1, since a file is perfectly similar to itself, and values below 1 indicate how much the files deviate from each other. In this matrix, File 2 is more similar to File 3 (value of 0.85) than it is to File 4 (value of 0.2). With a matrix like this in hand, for each file, the other files are ranked from most similar (highest similarity value) to least similar (lowest similarity value), not including (i) the file itself (it is not practical to route the user back to the same material they have struggled on), and (ii) future files (files appearing later in the syllabus have not been covered yet, and may contain more complicated material the instructor has not yet taught). According to this logic, in FIG. 5, File 1's closest neighbor is File 2, File 2's is File 1, and so on (entries bolded). The most similar one here, for example, could be the video from the unit where the test question occurs. Then the web application will display that video to the user. By doing so, the web application is capable of forming an individualized and customized user learning experience across different learning modes. An example of algorithmically designing the path is illustrated in FIG. 6. The solid line route is an example of triggered individualization whereas the user is routed to the video in Module 3 (denoted M3) and then the article in Module 5 (denoted M5). Another example is the dashed line route whereas the user is routed to the article in Module 4 and then the PDF in Module 5.

Note that in Path Switching, the present invention sets guidelines for individualization. As noted, although a preferred path is initially established, the path can be altered based on individualization. First, individualization is stopped either when the user no longer activates a trigger or a maximum number of alternate paths for a file have been tried. Second, the present invention may re-route a user to multiple content files within the same reviewing session, either sequentially (i.e., one file at a time, in sequence) or concurrently (i.e., within the same view), with the next decision point occurring after the user has finished visiting all of the content on the alternate path. An example would be a user triggered a re-routed individualization that leads to, for example, two PDF that come from different modules. The IIC player may display two PDFs side by side concurrently.

After such individualization, the present invention aims to assist the user in improving learning quality. For example, in the test question trigger example, the present invention aims to assist the user in answering the test question correctly. If still incorrect, than the backend computes cosine similarity between the test question vector and vectors from previous units. The backend will then find the mode with the highest similarity and present that as the next module to the user. If still incorrect, this process will repeat until the user answers the question correctly or a maximum number of test attempts is exceeded. This "time out" is similar to the time out of triggering additional reviewing paths within paths, as described previously. Overall, the present invention will search for one of the triggers that trigger the individualization again the next time the user goes through the unit. The system of the present invention will keep delivering other content until no triggers are found, or until a timeout counter is reached, at which point the learning process will proceed according to the original path.

Note that the present invention includes, but is not limited to, Natural Language Processing methods to automatize individualization. Another method to generate individualization may be having users initially run through the courses and individualize themselves. By collecting behavioral data and analyzing the data, one can identify successful learning paths and then route subsequent users along these successful paths. This method, for example, does not require Natural Language Processing techniques.

Overall, the present invention helps users to navigate the necessary relevant material via machine learning methods. Instead of users search for the relevant material themselves, the backend conducts NLP to assist students doing that.

In the present invention, triggers such as incorrect attempts and certain behavior motifs will trigger the individualization. Our system will then be able to use natural language processing and machine learning methods to help students find or be delivered the best available content that corresponds to that particular test question. By doing so, the present invention is able to help students to locate the content that will help students to enhance their learning. Additionally, by automatically locating the best available content, the present invention helps to reduce learning time and to optimize learning efficiency.

SUMMARY

1) We developed new frameworks for representing student video-watching behavior as sequences.

2) We extract recurring motifs of student video-watching behavior using motif identification schemes, and associate these fundamental patterns with quiz performance.

3) We demonstrate that video-watching behavior can be used to enhance student performance prediction on a per-video basis, e.g., for earliest detection.

This combination of summary items are used as input to determining student proficiency and understanding of course material and are used for selection of the next module to deliver to the student.

In general, algorithmic approaches are used toward selecting modules for delivery. That is, if the system can select among several modules for delivery, the method of the present invention determines various approaches to module selection (alone or in combination, shown below as examples):

To the extent that a student has shown difficulty in understanding some topic, such as through repeating sections with that topic or poor performance on a quiz, the methodology of the present invention allows for selecting a module which provides greater detail around that topic.

If the student demonstrates proficiency with a formulaic approach, the next module would be more formulaic.

If the student demonstrates confusion with certain concepts, those concepts would be included in a next module but delivered with an alternate approach.

To the extent the student demonstrates body language of understanding or confusion, that input would be used in the next module.

If a student has demonstrated difficulty with a particular topic and the topic is to appear in a next module, the student can be provided with refresher questions or can be quizzed earlier in the module relative to that topic.

To the extent students follow known motifs, modules may be selected conformant to success with similar modules of students that have following similar motifs.

To the extent the student uses social networks to ask questions or obtain information regarding specific content, that topic can be focused on in questions or in a next module.

To the extent the student answers questions correctly on first attempt, second attempt, and so on, a decision is made as to which next module to deliver.

The design process can be alternatively depicted as a series of four modules: inputs, user modeling, path generation, and path selection, as illustrated in FIG. 1A.

Inputs—This refers to the types of inputs that the system collects. We explicit identify types of collected inputs: assessment points, viewing behavior, social learning network (SLN), and annotations. Additionally, pre-processing can be performed to give a richer and/or more useful set of inputs for the modeling stage. In particular, performance prediction can be used to estimate a user's score on assessments she did not take.

User modeling—This refers to machine learning techniques that map the inputs to update a low-dimensional user model (UM), which contains information about a student's current state of learning. We refer to the dimensions of the UM as the learning features of the course, which guide the content adaptation based on user knowledge and/or similarity to them. The feature set is typically author-specified, giving her leeway in deciding the number, designation, and even interpretation of features; they can represent any of user "goals, knowledge, background, hyperspace experience, and preferences".

Path generation—The purpose of this is to specify each of the learning paths a user may follow as a result of adaptation logic. This logic will compare the UM to the properties of each path and select the one that best suits the user. We say that each learning path consists of a sequence of segments; one can think of a segment (seg) as the smallest unit of knowledge presented before/after an assessment. A segment may also have a number of different versions, corresponding to alternate presentations of the content.

Path selection—This is directed to determining the next module for delivery. In a static regime, the path is fixed based on information acquired at the beginning. However, we currently use a step-by-step approach where the next module is determined at the end of the current one, so only the learning path up to the current point is known. Another alternative is sequencing/re-sequencing, where at any given point a user is assigned to an end-to-end path, which will switch if another is found more suitable to the current UM.

The following describes a selection of approaches used in developing the present invention.

For one, early detection performance prediction systems that are usually driven by past performance history—which tends to be a sparse source of information in Massive Open Online Courses (MOOCs)—could be augmented with behavioral signals that were identified as being correlated with low or high student performance. Additionally, algorithms for updating user models in individualization could be expanded to include behavioral signals in making determinations as to the most suitable path of learning for each student to take. Furthermore, these relationships could be provided to course instructors directly, in the form of extended learning and content analytics. The behavioral signals could give instructors insight into which parts and/or types of their content are causing confusion.

The present invention has been described in the context of the behavior students exhibit while watching lecture videos. This is a dominant mode of instruction provided in online courses, and is where users spend the majority of their time on MOOC platforms. These behaviors are captured through clickstream logs, although, as detailed elsewhere, such behavior can include physical movements of students, such as but not limited to eye and body movements.

Also, measures of performance used by the present invention have been described as the scores that students obtain on their first attempts at quizzes, i.e., whether they are Correct on First Attempt (CFA) or not (non-CFA). However, other indicators of "performance," like engagement level, completion rate, or even factors outside of the IIC application provided by an instructor (like job task performance), are equally applicable to the present invention.

With these two specific measures, our goal is to relate video-watching behavior to in-video quiz performance. We are able to identify video-watching motifs, i.e., sub-sequences of student behavior that occur significantly often, in two datasets. These motifs by themselves are informative of recurring behaviors, and we are able to correlate the occurrence of certain motifs in a dataset with a change in the likelihood of CFA through mixed-effects modeling. For example, we find that a series of behaviors are indicative of students reflecting on material, and tend to be associated with an increase in the chance of CFA in one of our courses and of non-CFA in the other. As another example, we identify motifs that are consistent with rapid-paced skimming through the material, and reveal that these are associated with a decrease in the chance of CFA in both of our courses.

In seeking appropriate models for behavior-based prediction, we find that while some behavioral patterns of the motifs are significantly associated with quiz performance, their supports across sequences are not sufficient to make large improvements in online CFA prediction. As a result, we propose a second behavioral representation, which is based on the sequence of positions visited in a video.

Now, it is important to remove noise in the video-watching trajectories associated with unintentional user behavior. We handle two cases of events separately:

(i) Combining events: We combine repeated, sequential events that occur within a short duration (5 sec) of one another, since this pattern indicates that the user was adjusting to a final state. This is a common occurrence with forward and backward skips, where a user repeats the same action numerous times in a few seconds in seeking the final position; this should be treated as a single skip to the final location. Similarly, a series of rate change events may occur in close proximity, indicating that the user was in the process of adjusting the rate to the final value, which should also be treated as a single event.

(ii) Discounting intervals: Clickstream logs are the most detailed accounts of a student's video-watching behavior that are available for online courses today. Even so, it is not possible to determine with complete certainty whether a student is actually watching/focused on the video for the duration of time in-between the occurrence of two events. Still, we can identify two situations. The first situation is if the duration between events is extremely long; in this case, the user was obviously engaging in some off-task behavior during this time. The second situation is if events occur on two different videos; here, there is no continuity as the user must have exited the first video and opened the second.

Several algorithms can be used to extract motifs from behavioral data. One such approach used by the present invention is based on a probabilistic mixture model, where the key assumption is that each subsequence is generated by one of two components: a position-dependent motif model, or a position-independent background model. Under the motif model, each position j in a motif is described by a multinomial distribution, which specifies the probability of each character occurring at j. The background model is a multinomial distribution specifying the probability of each character occurring, independent of the positions; we employ the standard background of a 0-order Markov Chain. A latent variable is assumed that specifies the probability of a motif occurrence starting at each position in a given sequence.

Motif extraction is formulated as maximum likelihood estimation over this model, and an expectation-maximization (EM) based algorithm is used to maximize the expectation of the (joint) likelihood of the mixture model given both the data (i.e., the sequences) and the latent variables. We use the standard dirichlet prior based on character frequencies for EM.

Figure 7:
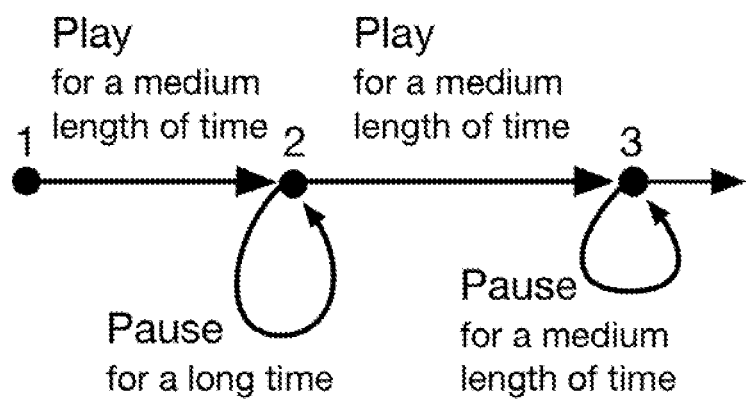
FIG. 7 depicts an example of a user reflecting on specific video content in a module. The horizontal axis represents a position in the video. There are three positions here: 1, 2, and 3. The user has paused on positions 2 and 3.

As described previously, we have identified four groups of motifs with this model:

(i) Reflecting, i.e., pausing to reflect on the video material repeatedly (depicted visually in FIG. 7). If the time spent reflecting is not too long relative to the time spent watching, this tends to be correlated with a higher chance of success on the quiz. At the same time, if the pausing is very short, it could indicate unresolved confusion.

Figure 8:
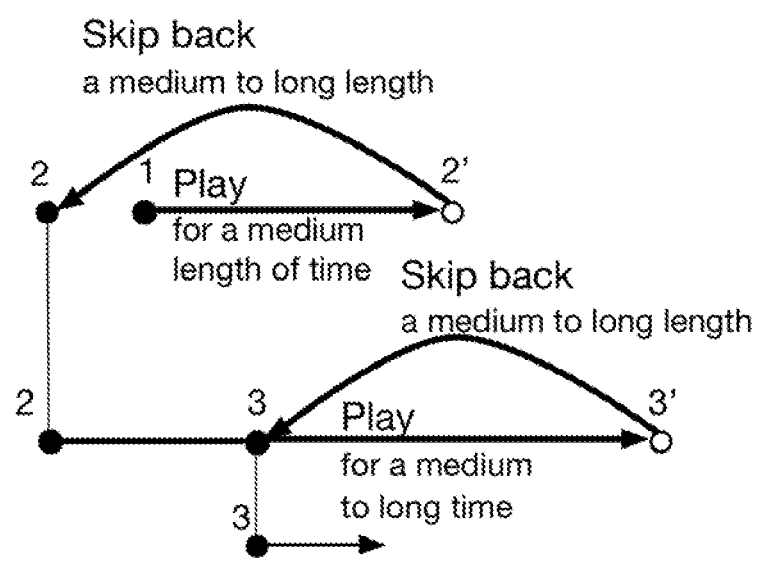
FIG. 8 depicts an example of a user revising content within a module. Horizontal jumps represent skips with lengths relative to the distance (e.g., skip back from 2' to 2, and from 3' to 3), and vertical jumps just indicate continuity.

(ii) Reviewing, i.e., repeated revision of the video content just watched (depicted visually in FIG. 8). This tends to be correlated with an increase in the chance of success.

Figure 9:
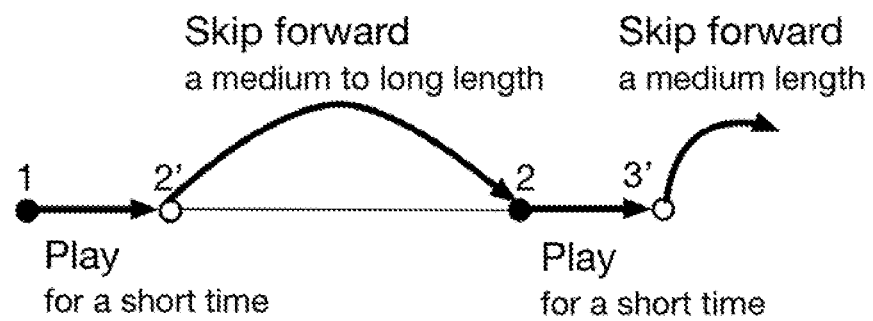

(iii) Skimming, i.e., skipping through video material quickly (depicted visually in FIG. 9). This tends to be associated with a lower chance of success, even when done with caution.

(iv) Speeding, i.e., watching the video at a faster than default rate and slowing down at certain times. Different variations are associated with different impacts on the chance of success.

Some motifs are significantly correlated with substantial changes in the probability of CFA, independent of the specific videos and/or students (the increases can be as high as 9%, and the decreases as low as 10%). For each motif, the direction of the association is particularly important, because in many cases either would be intuitive. For example, a revising motif could presumably come from a student reinforcing material in the video prior to taking the quiz (in line with an increase in CFA probability) or from excess confusion caused by the material in the video (in line with a decrease in CFA probability), but the results indicate the former tends to be more likely in these courses. As another example, skimming could come from a student believing confidently that he/she is already familiar with the content in a video, which could intuitively be either a correct (increase in CFA probability) or an incorrect (decrease in CFA probability) perception, but results favor the latter.

Finally, we emphasize the importance of having included the lengths/durations in our sequence representation framework in order to make these conclusions. For instance, certain sequences have been identified is not possibly being associated with revising, because it is not clear how far back the student has skipped relative to having played in-between. In the same way, other sequences cannot be concluded as skimming, because the lengths of play and skip are not indicated in the model. Also, even small changes in the motif lengths can affect.

The invention claimed is:

1. A method for a multi-engine, processor-based server in communication with a data store and a remote multimedia interactive student graphical user interface (GUI) on a student's display, said GUI operating with said display and configured to capture student actions for delivery to said server, to select and deliver interactive course modules to a computer display customized to a student's learning abilities determined based on said student's actions, said customization occurring during course delivery, comprising the steps of:

organizing the content of a course into modules individually deliverable to a GUI, each said module stored in a data store and including at least one of text, video, and images;

with an engine for processing sound, image, and natural language, identifying the frequency of words and topics in each said module;

with a vector development engine, using said determined frequency of words and topics in each said module, forming a first vector relative to each said module, each said first vector stored in a data store;

with said vector development engine, forming a second vector relative to each module, each said second vector representing individual and sequences of actions, together with times between actions, for prior students interacting with the associated module, together with each prior student's determined comprehension of content, and storing each said second vector in a data store, where said actions include at least one of clicks, rewinds, and student generated starts and stops;

with said vector development engine, forming a third vector specific to said student, said third vector representing said student's prior actions and times between actions relative to any prior courses taken by said student, together with determined comprehension of said student, and storing said third vector in a data store;

with a delivery engine, delivering a first course module to said student GUI using an internet, for display and interaction on said GUI, said GUI including a programmed capture engine for capturing student actions and time between actions by said student and delivering said captured actions and times between actions to said vector development engine, thereby forming a fourth vector, said fourth vector characterizing said student's actions, times between actions, and sequences of actions in said first module, delivering said first and said second vectors associated with said delivered module and said third and fourth vector to an analysis engine for comparison, said comparison including said captured data analyzed as both individual and sequences of actions and identifying known events associated with comprehension for said student and updating said third vector;

identifying potential next modules to deliver to said student based on an analysis of completed topics and remaining topics in a syllabus;

analyzing said fourth vector to identify sequences of actions known to be associated with a student's learning ability;

upon such an event being identified relative to at least one sequence of actions, assessing said student's comprehension by topic and type of content of said first module's content further assessing said student's learning ability and comprehension by topic and type of content by comparing said fourth vector for the delivered module relative to said first and second vectors relative to the delivered module;

updating said third vector and determining a next module to deliver to said student from said identified potential next modules based on comparison of first and second vectors of potential next modules; and delivering said determined next module to said student.

2. The method of claim 1, wherein the step of determining is based at least in part on calculating highest likelihood of improvement in percent correct for said student on a first attempt in quizzes in the next module.

3. The method of claim 1, wherein each said sequences of actions is characterized as including combinations of any one of reflecting, reviewing, skimming, or speeding and said best fit comparison includes an analysis of said sequences against similar sequences associated with known learning abilities.

4. The method of claim 1, wherein in the step of determining, extended intervals are discounted.

5. The method of claim 1, wherein said comparison is based on cosine similarity.

6. The method of claim 1, wherein text identification includes natural language processing.

7. The method of claim 1, wherein said GUI further captures biosensed bodily movements together with time between events and said bodily movements are used for formulating said fourth vector of said student's actions.

8. The method of claim 7, wherein student bodily movements include eye and hand movements, and events include said student changing status between in front of and away from the display.

9. The method of claim 8, wherein said student's eye and body movements are captured by a camera associated with said computer display.

10. The method of claim 9, wherein said assessing includes an analysis of said student's eye and body movements.

11. A method for a server with access to a data store and an interactive GUI player to deliver course content customized to a student for presentation on a display using the internet comprising the steps of:

in a stored collection of course modules, identifying and storing by text term the frequency of text terms in each module in said collection of modules;

delivering a first course module to a player in control of said student for display and interaction;

formulating a module vector for each course module, each module vector arranged algebraically by text term describing course content of its associated module;

tracking student behaviors relative to said first course module using said player and said server receiving said student behaviors from said player;

formulating a student vector, arranged by text term, describing the student's tracked behaviors, said student's tracked behaviors including clicks, rollovers, time between events, quiz responses, and eye and body movements and said student vector being characterized by frequency of text terms in said student's tracked behaviors;

selecting a next module for delivery based on a statistical comparison of each of said module vectors to said student vector and a comparison of completed topics to a course syllabus; and delivering said next module to said student.

12. The method of claim 11, wherein each said module vector is further calculated using an automated thesaurus so as to aggregate like-meaning terms to determine frequency of terms for said vector.

13. The method of claim 11, wherein each said module vector includes weightings based on words appearing in a course syllabus.

14. The method of claim 11, wherein said student vector has weighting factors based on frequency of student rewinds.

15. The method of claim 11, wherein said student vector includes an accounting for student tracked behaviors in previously viewed modules by said student.

16. The method of claim 11 wherein each said module vector is further formulated based on converting any video or audio content to text.

17. A system for selecting and sequencing delivery of course modules over an internet, customized to a student, comprising;

a processor-based server;

a data store; and a display for displaying course content for student interaction and for collecting and forwarding student behavior events together with time between student behavior events, where said student behavior events include clicks, rollovers, and video control;

wherein said data store is used for storing said course content in modular form; and said processor-based server is used to convert audio and video to text, store said text and the frequency of said text with the related module, calculate a vector representing text content of each module, use tracked student behavior events for formulating a student vector, calculate a student vector in consistency with said behavior events, and perform a statistical analysis of said student vector relative to each module vector to determine which next module to deliver to said student.

18. The system of claim 17, wherein said display further includes recording means for visually recording physical movements of said student and said server includes said physical movements in tracked student behaviors.

19. The system of claim 17, wherein said display further includes recording means for visually recording eye movements of said student and said server includes said eye movements in said tracked student behaviors.

20. The system of claim 17, wherein said student vector has weighting factors based on frequency of student rewinds.

* * * * *